(12) United States Patent
Hudson

(10) Patent No.: US 6,189,479 B1
(45) Date of Patent: Feb. 20, 2001

(54) METHOD AND APPARATUS FOR DETECTING A TEMPERATURE INCREASE IN AN ELECTRICAL INSULATOR

(75) Inventor: Arthur J. Hudson, Pittsburgh, PA (US)

(73) Assignee: The United States of America as represented by the Department of Health and Human Services, Washington, DC (US)

(*) Notice: Under 35 U.S.C. 154(b), the term of this patent shall be extended for 0 days.

(21) Appl. No.: 09/361,008

(22) Filed: Jul. 27, 1999

(51) Int. Cl.[7] ............................. G01K 1/02; G01K 11/06
(52) U.S. Cl. ..................... 116/217; 116/216; 116/218; 374/160; 374/26
(58) Field of Search .................................. 116/216, 217, 116/218; 374/155, 160

(56) References Cited

U.S. PATENT DOCUMENTS

| | | | |
|---|---|---|---|
| 2,350,637 | * 6/1944 | Pittman | 116/218 |
| 3,877,411 | 4/1975 | MacDonald | 116/114.5 |
| 4,356,790 | * 11/1982 | Gee | 116/218 |
| 4,421,053 | * 12/1983 | Volk | 116/218 |
| 4,775,839 | 10/1988 | Kosina et al. | 324/536 |
| 4,818,119 | * 4/1989 | Busch et al. | 374/208 |
| 4,947,786 | * 8/1990 | Maynard et al. | 116/218 |
| 5,033,865 | * 7/1991 | Kuze | 374/160 |
| 5,203,278 | * 4/1993 | Kinney | 116/218 |
| 5,321,567 | 6/1994 | Kano et al. | 360/85 |
| 5,487,352 | * 1/1996 | Williams et al. | 116/218 |
| 5,720,555 | * 2/1998 | Elele | 116/217 |
| 5,757,261 | 5/1998 | Becher et al. | 337/377 |
| 5,799,606 | * 9/1998 | Volk et al. | 116/218 |
| 5,922,996 | 7/1999 | Ryeczek | 174/112 |

OTHER PUBLICATIONS

Anis, "An Electromagnetic Detector of Insulator Surface Discharge", *Transactions on Industry Applications*, vol. IA–22, No. 1, Jan./Feb. 1986, pp. 75–79.

Richards et al., "Development of a Remote Insulator Contamination Monitoring System", *IEEE Transactions on Power Delivery*, vol. 12, No. 1, Jan. 1997, pp. 389–397.

* cited by examiner

Primary Examiner—Diego Gutierrez
Assistant Examiner—Faye Francis
(74) *Attorney, Agent, or Firm*—Klarquist Sparkman Campbell Leigh & Whinston, LLP

(57) ABSTRACT

The present invention provides a heat-sensitive warning device and a related method for visually detecting an increase in the temperature of the outer surface of an electrical insulator, which may indicate the unsafe flow of leakage electrical current through the electrical insulator, prior to a fire, an explosion or some other unsafe event. When the temperature of the outer surface of the electrical insulator increases to a preselected temperature, a visual indication of this rise in temperature will be provided by the ejection of a spool from a heat-sensitive warning device which has been attached to the outside of the electrical insulator. The temperature at which this visual indication of electrical insulator temperature increase occurs is preferably well below an unsafe temperature for the particular electrical insulator being used under the particular conditions of use, such as the autoignition temperature of coal or coal dust, so that the electrical insulator may be replaced prior to reaching this unsafe temperature.

11 Claims, 1 Drawing Sheet

METHOD AND APPARATUS FOR DETECTING A TEMPERATURE INCREASE IN AN ELECTRICAL INSULATOR

BACKGROUND OF THE INVENTION

1. Field of the Invention

The present invention relates generally to a method and an apparatus for detecting an insulation failure in an electrical insulator through a ground fault and, more particularly, to such method and apparatus which provides visual indicia of a temperature increase in the electrical insulator, which may indicate the flow of potentially harmful leakage electrical current through the electrical insulator. The apparatus and method of this invention are especially useful in underground mining operations.

2. Background and Related Art

Electrical insulators prevent the passage of electricity out of the electrical insulators to some other device or area, such as to a wooden pole which holds electrical power lines off of the ground, so that the electricity does not cause harm or death to those who touch areas or devices which are adjacent to the electrical insulators.

High-voltage insulators are generally large-sized components produced from porcelain which isolate high voltage electrical power lines at electrical power generation stations, and within the transmission and distribution networks of the major utilities. Low-voltage insulators are typically used as feed-through insulators or stand-offs. High-strength porcelain is generally used in the manufacture of insulators for transformers, switch gears, terminators and low voltage distribution applications.

The advantages of providing electrical service to underground mines is well known. Many of the operations performed in underground mines today could not otherwise be performed were it not for the availability of electrical power underground at the mine face. Typically, electrical service is provided underground via a series of electrical conductors extending from an above-ground power distribution center and down the mine shaft. The electrical conductors, which are normally suspended from the mine shaft roof by electrical insulators, provide electrical power for much of the underground equipment, such as mining machines, conveyor belt systems and trolley systems which dislodge, transfer and carry mined coal or other materials from the mine face to above-ground storage facilities.

The electrical insulators used to suspend electrical conductors from the mine shaft roof must be capable of withstanding the rigors of an extremely harsh working environment. Moisture, exposure to mining chemicals and minerals (including mining dusts), and the almost constant vibration caused by operating machinery and moving vehicles in the mine tend to cause the electrical insulators used to suspend electrical conductors from the mine roof to begin to fail over time. As an electrical insulator begins to fail, it allows a "leakage" electrical current to flow through the electrical insulator from the electrical conductor to the earth ground to which the electrical insulator is anchored. As the magnitude of the leakage current flowing through the electrical insulator increases, the temperature of the electrical insulator begins to rise. When the temperature on the outer surface of the electrical insulator reaches a certain critical temperature equal to the autoignition temperature of coal, coal dust or other dust, a fire can occur due to the faulty electrical insulator. The occurrence of a fire in an underground mine can not only result in the destruction of mining equipment and closure of the mine, but more importantly can result in the injury or death of mining personnel.

In an effort to detect faulty electrical insulators used in underground mining operations, a system has heretofore been employed which includes an electric lamp mounted on a wooden pole. The lamp is wired to a pair of electrical contacts, one at each end of the pole. The wooden pole is positioned relative to an electrical insulator so that one of the electrical contacts is in contact with the electrical insulator and the other electrical contact is in contact with the electrical conductor suspended from the electrical insulator. Illumination of the electric lamp provides an indication that the electrical insulator under test is faulty.

The electric lamp/wooden pole assembly has shortcomings. For example, testing each and every electrical insulator in an underground mining system with such an assembly would be extremely time consuming, and would result in the possible delay in mine operations. In addition, the condition of a particular electrical insulator could not be determined visually without actually using the electric lamp/wooden pole assembly. Thus, failures of insulators will not be detected until the next scheduled test or evaluation. Consequently, a need exists for improved warning methods and devices for providing visual indicia of a faulty electrical insulator which overcomes the difficulties of the prior art.

SUMMARY OF THE INVENTION

The present invention relates to a method and a heat-sensitive warning device designed to satisfy the aforementioned needs, and to provide a visual indication of a temperature increase on the outer surface of an electrical insulator, which is indicative of the flow of potentially harmful leakage electrical current through the electrical insulator, prior to the development of a significant risk of a dangerous situation such as a fire or explosion. This device may be used in any electrical power-conducting system in which an electrical insulator is in a path to ground (e.g., mines, refineries, off shore oil platforms, chemical and other plants, etc.). The heat-sensitive warning device of the invention provides visual indicia of a heat rise in an electrical insulator (indicating an electrical insulator short and potential safety hazard) without mine or other personnel assistance. The presence of a faulty electrical insulator anywhere in an electrical power-conducting system may be detected visually or otherwise without personal assistance. Once detected, the faulty electrical insulator may be replaced well in advance of the electrical insulator reaching an unsafe temperature, such as the autoignition temperature of coal, coal dust or other dust.

The present invention also provides a heat-sensitive warning device which may be fitted on the outside of any electrical insulator utilized in any electrical power-conducting system in which an electrical insulator is in a path to ground. This device also detects an increase in the temperature of an outer surface of an electrical insulator, which may indicate the flow of potentially harmful leakage electrical current therethrough, and also provides visual or other indicia of this increase in temperature.

One preferred heat-sensitive warning device of the invention comprises: (a) a hollow housing in thermal contact with the outside of an electrical insulator, and having an open first end and a partially open second end; (b) a spool positioned within the hollow housing; (c) an indicator element (e.g., a Telfon™ ribbon) wound around the spool and having a first end secured to the spool and a second end secured to an outer wall of the housing; (d) a first thermosensitive end plug which seals the open first end of the housing, which encloses the spool and the indicator element within the housing, the first thermosensitive end plug being made from a material which melts at a first preselected temperature which is above ambient temperature and which is below a second preselected temperature; (e) a second thermosensitive end plug which seals the partially open second end of the housing, which also encloses the spool and the indicator element within the housing, both prior to and after the melting of the first thermosenstitive end plug, the second thermosensitive end plug being made from a material which melts at a second preselected temperature, the second preselected temperature being the same as, or above, the first preselected temperature and below an unsafe temperature for the particular electrical insulator being used under the particular conditions of use; and (f) ejection means positioned within the hollow housing for ejecting the spool and the indicator element through the open first end of the housing to an area outside of the housing upon melting of the second thermosenstitive end plug, which will have melted simultaneously with, or after, the melting of the first thermosensitive end plug. As the electrical insulator experiences a flow of leakage electrical current therethrough sufficient to cause a rise in temperature on an outer surface of the electrical insulator, the first thermosenstitive end plug melts upon reaching the first preselected temperature to clear the opening in the first open end of the housing. The second thermosenstitive end plug melts upon reaching the second preselected temperature, which activates the ejection means, whereupon the spool and the indicator element attached thereto are ejected out through the open first end of the housing to an area outside of the housing, thereby exposing the indicator element. Using a ribbon (preferably a Teflon™ ribbon) as the indicator element, the ribbon unfurls as the spool falls by gravity, thereby providing visual indicia to an observer of the housing of the potential harmful flow of leakage current through the electrical insulator.

These and other features and advantages of the present invention will become apparent to those skilled in the art upon a reading of the following detailed description when taken in conjunction with the drawings wherein there is shown and described a preferred embodiment of the invention.

DETAILED DESCRIPTION OF THE PREFERRED EMBODIMENTS

Figure 1:
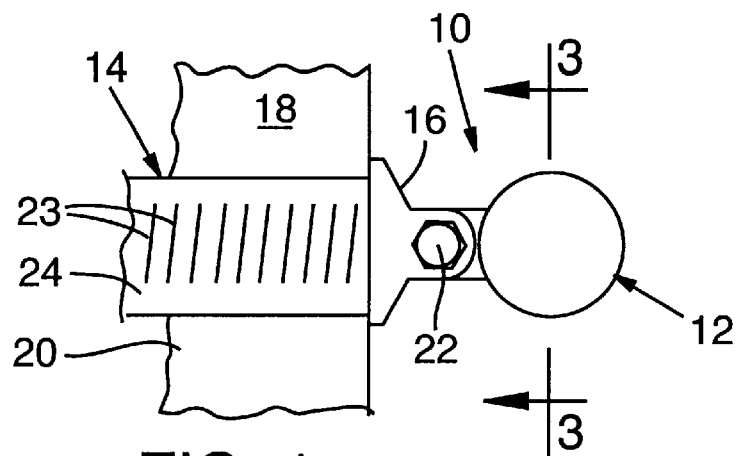
FIG. 1 is a side elevational view of a portion of a preferred heat-sensitive warning device of the present invention fitted to a portion of an electrical insulator.

The present invention provides a heat-sensitive warning device which may be fitted to an electrical insulator utilized in an underground mining operation, or in any other operation in which electrical insulators are used. Should the electrical insulator to which the warning device is attached begin to fail and conduct a leakage electrical current of sufficient magnitude to cause the temperature of the electrical insulator to rise, the warning device provides visual indicia of this temperature rise, so that mining or other personnel may replace the electrical insulator well before the temperature of the electrical insulator reaches an unsafe temperature, such as the autoignition temperature of coal or coal dust in mining operations. Replacement of the faulty electrical insulator prior to it reaching a temperature equal to the autoignition temperature of coal or coal dust, or some other unsafe temperature, eliminates a condition which could be potentially harmful to mine or other personnel and equipment.

A preferred heat-sensitive warning device of the invention comprises (a) an operating mechanism, the operating mechanism comprising: (1) a housing made from a material which can transfer heat, the housing being in thermal contact with the electrical insulator or with a device for attaching the operating mechanism to the electrical insulator, and the housing having an open first end and a partially open second end having an opening; (2) a spool, the spool being inside of the housing, and the spool being of a size which allows it to pass through the open first end; (3) an indicator element (e.g., a Telfon™ ribbon), the indicator element being wound around the spool, and the indicator element having a first end secured to the spool and having a second end secured to the housing; (4) a first thermosensitive end plug which seals the open first end of the housing, the first thermosensitive end plug being made from a material which melts at a first preselected temperature above ambient temperature and at or below a second preselected temperature; (5) a second thermosensitive end plug which seals the opening in the partially open second end of the housing, the second thermosensitive end plug being made from a material which melts at the second preselected temperature, the second preselected temperature being above ambient temperature, being at or above the first preselected temperature and being below an unsafe temperature for the electrical insulator; and (6) an ejection mechanism positioned within the housing for ejecting the spool and the indicator element through the open first end of the housing to an area outside of the housing upon the melting of the second thermosenstitive end plug, the ejection providing a visual indication of an increase of the temperature of the electrical insulator; and (b) a device for attaching the operating mechanism to an outer surface of the electrical insulator, the device being in thermal contact with the electrical insulator.

Preferred embodiments of the heat-sensitive warning device of the present invention will now be described with reference to the drawings. In the drawings, like reference symbols indicate the same parts of the devices throughout the different drawings. The present invention is not limited to the precise arrangements, configurations, dimensions and/or instrumentalities shown in the drawings, or described hereinbelow.

Figure 2:
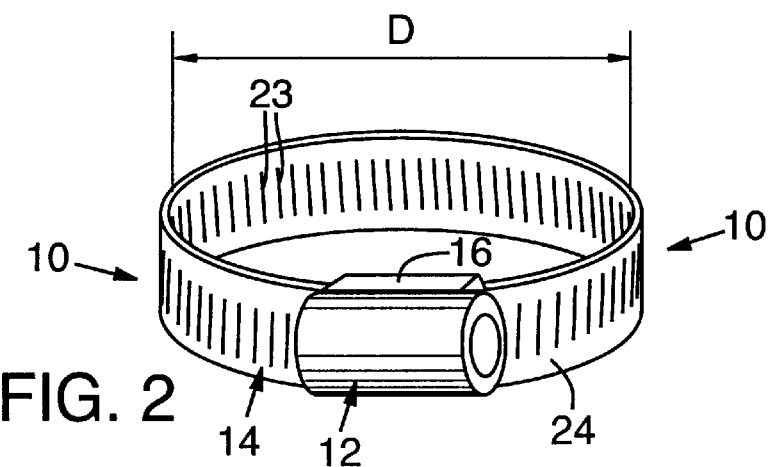
FIG. 2 is a perspective view of the preferred heat-sensitive warning device of the present invention being removed from the insulator.

FIG. 1 illustrates a side elevational view of a portion of a preferred heat-sensitive warning device of the present invention 10 in an operational mode and in thermal contact with an insulator. FIG. 2 is a perspective view of the heat-sensitive warning device 10 removed from the insulator.

As is seen in FIGS. 1 and 2, the heat-sensitive warning device 10 comprises an operating mechanism 12, suitably secured, such as by brazing, to a clamp 14 for attachment to the outside of an electrical insulator 18. The clamp 14 is constructed of a material which can effectively transfer heat, preferably stainless steel. The clamp 14 has an adjustment mechanism 16 which allows the clamp 14 to be fitted securely around an electrical insulator 18, such as the portion of the electrical insulator 18 illustrated in FIG. 1. The clamp 14 may be fitted securely to the outer surface 20 of the electrical insulator 18 by selectively tightening or loosening an adjustment screw which engages a series of diagonal slots 23 located around the surface 24 of the clamp 14. Rotation of the adjustment screw 22 in a clockwise direction causes a reduction in the diameter "D" of the clamp 14 and, conversely, rotation of the adjustment screw 22 in a counterclockwise direction causes the diameter "D" of the clamp 14 to increase. The adjustment screw 22 is operated so that the clamp 14 fits securely against the outer surface 20 of the electrical insulator 18 to provide good thermal contact therewith. With the heat-sensitive warning device 10 fitted to the outside of an electrical insulator 18, as illustrated in FIG. 1, heat generated as electrical leakage current flows through the electrical insulator 18 is transferred through the clamp 14 to the operating mechanism 12 of the heat-sensitive warning device 10. Other methods or devices for attaching the operating mechanism 12 of the heat-sensitive warning device 10 to the electrical insulator 18 which achieve this heat flow from the electrical insulator 18 to the operating mechanism 12 of the heat-sensitive warning device 10 may also be used, so long as the ability of the attachment device to effectively transfer heat is maintained. Similarly, other adjustment mechanisms may be used, so long as the ability of the attachment device to effectively transfer heat is maintained.

Figure 3:
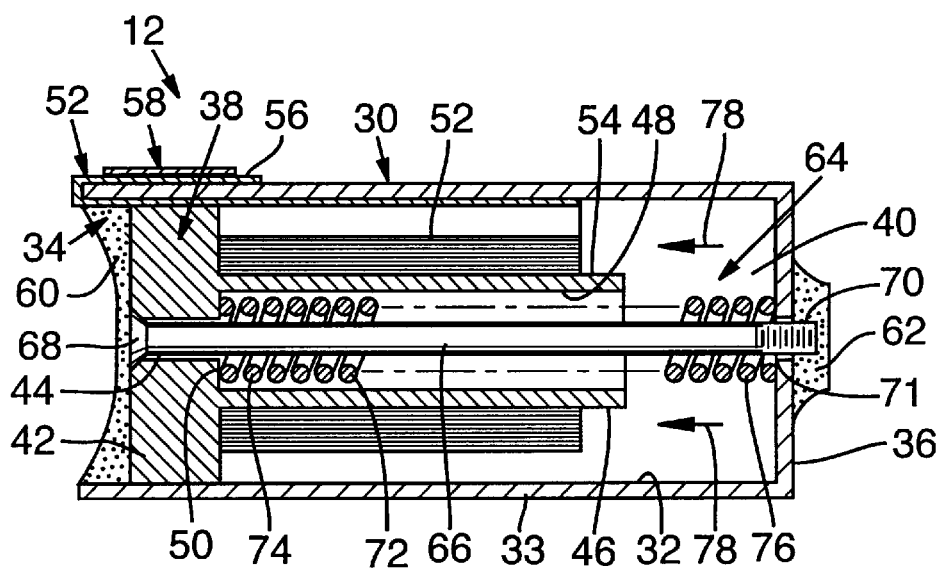
FIG. 3 is a side elevational view, partially in section, of the operating mechanism portion of the preferred heat-sensitive warning device of the present invention.

FIG. 3 illustrates a side elevational view, partially in section, of the operating mechanism 12 of the heat-sensitive warning device 10 taken along line 3—3 of FIG. 1. The operating mechanism 12 comprises an elongated hollow housing 30 in thermal contact with the clamp 14 (or other attachment device) or the electrical insulator 18 and having a spool 38 located within the housing 30. The size and shape of the housing 30 are not critical, as long as the spool 38 can fit therein and can be ejected at the appropriate time. The housing 30 may be made from any material which can transfer heat; preferably the housing 30 is metal with brass being most preferred. For example, the housing 30 may be cylindrical in shape, and be about 2 inches in length and about 0.5 inches in diameter. Of course, other shapes and dimensions can be used if desired. The housing 30 has an inner wall 32, an outer wall 33, an open first end 34 and a partially open second end 36 which define the interior 40 of the housing 30. Unlike the open first end 34 of the housing 30, which is preferably completely open, the partially open second end 36 of the housing 30 is preferably mostly closed and contains a relatively small opening 71. The size and shape of the open first end 34 and partially open second end 36 of the housing 30 are not critical, as long as the size and shape of the open first end 34 are such that the spool 38 can be ejected therethrough. For example, they may be circular and about 0.5 and 0.5 inches in diameter, respectively.

The spool 38 is positioned within the interior 40 of the housing 30, and preferably has an enlarged end portion 42 with a bore 44 and a shank portion 46 extending from the enlarged end portion 42 toward the partially open second end 36 of the housing 30, which also has a bore 48. The bores 44 and 48 are preferably in registry, and since bore 48 preferably has a diameter larger than the diameter of the bore 44, a shoulder 50 is generally formed at the location where the enlarged end portion 42 meets the shank portion 46. The size and shape of the spool 38 are not critical, as long as they are such that the spool 38 can be ejected through the open first end 34 of the housing 30. The spool 38 may be made from various materials, including for example metal, glass, other suitable materials; preferably the spool 38 is brass. The size and shape of the enlarged end portion 42, shank portion 46 and bores 44 and 48 are not critical.

The operating mechanism 12 has an indicator element 52 wound around the shank portion 46 of the spool 38. The indicator element 52 may be of any suitable length and width, and may be made of any durable, and preferably flameproof, ribbon material. For example, the indicator element 52 can be a strip or tape approximately 18 inches long and 0.5 inches in width, which is made of colored polytetrafluoroethylene, nylon, Mylar or other suitable tape. Preferably the tape is flameproof. Teflon™ is especially preferred for the ribbon material. The inner end of the indicator element 52 (not shown) is preferably secured to the outer surface 54 of the shank portion 46 (or other portion) of the spool 38 by any flameproof tape, such as fiberglass electrical tape, or other flameproof means (e.g., adhesive). In the preferred embodiment, the outer end portion 56 of the indicator element 52 passes along the inner wall 32 of the housing 30, over the enlarged end portion 42 of the spool 38, out through the open first end 34 of the housing 30, and then is folded back on the outer wall 33 of the housing 30, where it is secured by a wrapping of flameproof tape 58 or other suitable flameproof means. The indicator element 52, however, may be attached to any other areas of the spool 38 and the housing 30, and in any other suitable manner.

The operating mechanism 12 also has first and second thermosenstitive end plugs 60 and 62, respectively, each of which is made of a meltable material (e.g., a precision melting point wax) having a suitable melting temperature. The first thermosenstitive end plug 60 seals the open first end 34 of the housing 30 and initially encloses the spool 38 and indicator element 52 within the interior 40 of the housing 30. The second thermosenstitive end plug 62 seals the opening 71 present in the partially open second end 36 of the housing 30, to initially retain the spool 38 and indicator element 52 within the interior 40 of the housing 30 before, and possibly after, the first thermosenstitive end plug 60 has melted to clear the opening of the open first end 34.

It is possible for the first thermosenstitive end plug 60 and second thermosenstitive end plug 62 to be made from the same material, which melts at the same temperature (above ambient temperature and below a temperature which is unsafe for the electrical insulator 18). However, it is preferable that the first thermosenstitive end plug 60 be made from a meltable material which melts above ambient temperature and below the melting temperature of the material used to make the second thermosenstitive end plug 62 (at a first preselected temperature). It is also preferable that the second thermosenstitive end plug 62 be made of a material which melts at a temperature above the melting temperature of the material used to make the first thermosenstitive end plug 60 and below a temperature which is considered to be unsafe for the particular electrical insulator 18 being used under the particular conditions of use (at a second preselected temperature). Using different melting materials for the plugs 60 and 62 should reduce the number of false positives and thereby increase the effectiveness and reliability of the device. Moreover, by having the plug 62 melt at a higher temperature, the spool 38 may be more forcibly ejected.

The meltable material used to make the first thermosenstitive end plug 60 is preferably a wax which begins to melt at a first preselected temperature of about 38° C. and the meltable material used to make the second thermosenstitive end plug 62 is preferably a wax which begins to melt at a second preselected temperature of about 65° C.

The second preselected temperature will vary generally between the first preselected temperature chosen and a generally unsafe temperature. For purposes of this invention, a generally unsafe temperature is a temperature which indicates a potentially dangerous leakage of electrical current flow through the electrical insulator 18 to which the heat-sensitive warning device 10 is attached; such unsafe temperature will depend upon the particular electrical insulator 18 and the particular operating conditions. For example, for electrical insulators 18 used in the coal mining industry, this temperature should be well below the autoignition temperature of coal or coal dust. For added margins of safety, it is generally preferred that maximum second preselected temperature is about 120° C. or lower. Generally, the first preselected temperature will range from about 35° C. to about 50° c., with from about 38° C. to about 40° C. being preferred, and about 38° C. being most preferred. Of course, as those of ordinary skill will realize, the lower limit of the first preselected temperature should be above the normal environmental temperature. Generally, the second preselected temperature will range from about 40° C. to about 120° C., with from about 50° C. to about 85° C. being preferred, with about 65° C. to about 75° C. being more preferred, and with about 65° C. being most preferred. Generally, the second preselected temperature should be equal to or greater than the first preselected temperature.

The operating mechanism 12 also has an ejection mechanism 64 positioned within the interior 40 of the housing 30 for ejecting the spool 38 and attached indicator element 52 from within the interior 40 of the housing 30 to an area outside of the housing 30 as the second thermosenstitive end plug 62 melts, so as to provide visual indicia that the electrical insulator 18 has failed. Any conventional or suitable ejection mechanism may be used. The ejection mechanism 64 preferably has an elongated rod 66 that passes through bores 44 and 48 of the spool 38 and out through the opening 71 in the partially open end 36 of the housing 30. The end of the rod 66 which faces the open first end 34 preferably contains an enlarged head 68 that is in abutting contact with the outer face of the enlarged end portion 42 of spool 38. The opposite end of the rod 66 preferably contains a threaded section 70 that extends beyond the partially open second end 36 of the housing 30 and is embedded in the second thermosenstitive end plug 62. Preferably, encircling the rod 66 is a coiled spring 72, being held in a state of compression, having one end 74 in contact with the shoulder 50 of spool 38, and its other end 76 being in contact with the interior surface of the partially open second end 36 of the housing 30.

For assembly, the inner end of the indicator element 52 may be taped to the outer surface 54 of the shank portion 46 of spool 38. The indicator element 52 may then be wound around the spool 38 with its outer free end being then secured to the outer wall 33 of the housing 30 by a wrapping of tape 58. The rod 66 may then be inserted through bores 44 and 48 of the spool 38 with the head 68 of rod 66 abutting against the outer face of the enlarged end portion 42 of the spool 38. The coiled spring 72, in a relaxed mode, may then be slipped over the rod 66 and passed through the bore 48 of the shank portion 46 of the spool 38 to form a subassembly with the one end 74 of the relaxed coiled spring 72 abutting against the shoulder 50 of the spool 38. This subassembly may then be inserted into the interior 40 of the housing 30 through the open first end 34 thereof such that the threaded end section 70 of rod 66, passing through the opening 71 of the partially open second end 36, extends a short distance beyond the exterior surface of the partially open second end 36 of housing 30. A plastic, metal or other capture nut (not shown) may then be threaded on the threaded end section 70 of rod 66 to compress the coiled spring 72, and temporarily retain the subassembly within the interior 40 of the housing 30 with the spring 72 in its compressed mode, as is shown in FIG. 3. The housing 30 is then moved to an upright position, resting on its partially open second end 36, and a hot wax or other meltable material in a liquid form is poured into the open first end 34 of the housing 30 and forms the first thermosenstitive end plug 60 as the material cools and solidifies. This first thermosenstitive end plug 60 seals the interior 40 of the housing 30 and the components therewithin from exterior foreign contaminants, and also serves to enclose the spool 38 with the indicator element 52 attached thereto and the coil spring 72 in its compressed state within the interior 40 of the housing 30. The housing 30 is then inverted, to now rest on its open first end 34 which has been filled with the first thermosenstitive end plug 60 material (now solidified), and the nut (not shown) which was threaded on the threaded end section 70 of rod 66 to compress coiled spring 72 is removed. A hot wax or meltable material in a liquid form which, when cooled forms the second thermosenstitive end plug 62, is then poured over and around the portion of the threaded section 70 of rod 66 which extends beyond the exterior surface of the partially open second end 36 of the housing 30. As the meltable material cools and solidifies to form the second thermosenstitive end plug 62, the second thermosenstitive end plug 62 adheres to the threaded section 70 of rod 66 and, thereby, retains the operating mechanism 12 in its operative mode, as is shown in FIG. 3.

In operation, heat from the electrical insulator 18 is transferred through the clamp 14 to the brass or other housing 30 of the operating mechanism 12, and to the various components located therein. When the temperature of the first thermosenstitive end plug 60 reaches the first preselected temperature, for example, approximately 38° C., the first thermosenstitive end plug 60 begins to melt, and clears the open first end 34 of the housing 30. As the temperature of the various components within the operating mechanism 12 reaches the second preselected temperature, for example, approximately 65° C., the second thermosenstitive end plug 62 begins to melt. When the second thermosenstitive end plug 62 melts to an extent sufficient to break the adhesion between the threaded end portion 70 of the rod 66 and the second thermosenstitive end plug 62, the coiled spring 72 becomes released from its compressed state and expands, as indicated by the directional arrows 78 in FIG. 3, forcing or propelling the spool 38 outwardly through the open first end 34 of the housing 30 to an area outside of the housing 30. As the spool 38 then falls by gravity, the indicator element 52, with its outer end being secured to the outer wall 33 of housing 30 by tape 58, unfurls to an elongated strip of material, thereby providing visual indicia that leakage current is flowing through the electrical insulator 18 to an extent sufficient to potentially raise the temperature of the electrical insulator 18 to an unsafe temperature.

The present invention and many of its attendant advantages will be understood from the foregoing description. Various changes may be made in the form, construction and arrangement of the parts of the invention described herein without departing from the spirit and scope of the invention or sacrificing all of its material advantages, the form hereinbefore described being merely a preferred or exemplary embodiment thereof.

What is claimed is:

1. A heat-sensitive warning device for detecting an increase in the temperature of an electrical insulator, said device comprising:

(a) an operating mechanism comprising:

(1) a housing made from a material which can transfer heat, said housing being in thermal contact with said electrical insulator or with a device for attaching said operating mechanism to said electrical insulator, and said housing having an open first end and a partially open second end having an opening;

(2) a spool, said spool being inside of said housing, and said spool being of a size which allows it to pass through said open first end;

(3) an indicator element, said indicator element being wound around said spool, and said indicator element having a first end secured to said spool and having a second end secured to said housing;

(4) a first thermosenstitive end plug which seals said open first end of said housing, said first thermosensitive end plug being made from a material which melts at a first preselected temperature above ambient temperature and at or below a second preselected temperature;

(5) a second thermosensitive end plug which seals said opening in said partially open second end of said housing, said second thermosensitive end plug being made from a material which melts at said second preselected temperature, said second preselected temperature being above ambient temperature, being at or above said first preselected temperature and being below an unsafe temperature for said electrical insulator; and (6) an ejection mechanism positioned within said housing for ejecting said spool and said indicator element through said open first end of said housing to an area outside of said housing upon the melting of said second thermosensitive end plug, said ejection providing a visual indication of an increase of the temperature of said electrical insulator; and (b) a device for attaching said operating mechanism to an outer surface of said electrical insulator, said device being in thermal contact with said electrical insulator.

2. The heat-sensitive warning device of claim 1 wherein said first preselected temperature ranges between about 35° C. and about 50° C. and said second preselected temperature ranges between about 50° C. and about 85° C.

3. The heat-sensitive warning device of claim 2 wherein said first preselected temperature is between about 38° C. and about 40° C. and said second preselected temperature is between about 65° C. and about 75° C.

4. The heat-sensitive warning device of claim 1 wherein said housing is made of brass.

5. The heat-sensitive warning device of claim 4 wherein said indicator element is a ribbon made from polytetrafluoroethylene.

6. The heat-sensitive warning device of claim 1 wherein said device for attaching said operating mechanism to said electrical insulator is a clamp made from stainless steel, and said clamp is secured to said operating mechanism by brazing.

7. The heat-sensitive warning device of claim 5 wherein said device for attaching said operating mechanism to said electrical insulator is a clamp made from stainless steel, and said clamp is secured to said operating mechanism by brazing.

8. The heat-sensitive warning device of claim 7 wherein said ejection mechanism comprises:

(a) an elongated rod extending through said spool and through said opening in said partially open second end; and (b) a coil spring encircling said rod, said spring being held in a state of compression between said spool and said partially open second end until said second thermosenstitive end plug melts.

9. The heat-sensitive warning device of claim 8 wherein said spool has an enlarged end portion, a shoulder and a shank portion.

10. The heat-sensitive warning device of claim 9 wherein said indicator element is secured to said spool and to said housing with glass electrical tape.

11. The heat-sensitive warning device of claim 10 wherein said indicator element is wound around said shank portion of said spool, and one end of said indicator element is secured to an outer surface of said shank portion, and the other end of said indicator element is attached to an outer wall of said housing.

* * * * *